United States Patent Office 2,833,828
Patented May 6, 1958

2,833,828

SEPARATION OF ISOMERS OF DIHYDROXY DIPHENYL SULFONE

Thomas W. Sauls, College Park, Ga., assignor to Tennessee Corporation, New York, N. Y., a corporation of New York No Drawing. Application February 2, 1956
Serial No. 562,925

9 Claims. (Cl. 260—607)

This invention relates to the separation of isomeric dihydroxy diphenyl sulfones from one another and more particularly to the separation and purification of mixtures of p,p' dihydroxy diphenyl sulfone and o,p' dihydroxy diphenyl sulfone.

By way of example, the invention will be described hereinafter with reference to the product resulting from the preparation of dihydroxy diphenyl sulfone by the known method of reaction of an $SO_3$-containing acid on phenol at elevated temperatures. The product of such a reaction usually contains a major proportion of p,p' dihydroxy diphenyl sulfone and a minor amount of o,p' dihydroxy diphenyl sulfone. Methods heretofore employed to separate these isomers, such as lengthy and costly fractional crystallization or conversion to other compounds which can be separated by differential solubilities or otherwise, have entailed substantial drawbacks and one of the principal objects of the present invention is to overcome these drawbacks by providing a novel method for the direct separation of the aforesaid isomers in a simple, economical, and efficient way. Other objects will appear hereinafter as the description of the invention proceeds.

It has been found that p,p' dihydroxy diphenyl sulfone and o,p' dihydroxy diphenyl sulfone exhibit unexpected large differences in solubility in solvents having the general formula R—O—R' where R is a hydrocarbon radical and R' is also a hydrocarbon radical which may be either the same as or different from the radical R, at least one of these radicals being an aliphatic radical. It will be seen that this formula embraces aliphatic ethers and mixed aliphatic-aromatic ethers and defines a large number of specific compounds of wide variety. Preferably R and R' are unsubstituted hydrocarbon radicals which contain from one to six carbon atoms.

Table 1 illustrates the large differences in the solubilities of the aforesaid isomers in various ethers. These solubility measurements were made with highly purified isomers obtained by well known fractional crystallization methods using benzene-acetone mixtures and having melting points of 184–6° C. for the o,p' isomer and 242–5° C. for the p,p' isomer.

Table 1

| Ether | T., ° C. | Grams dihydroxy diphenyl sulfone/ 100 ml. ether | |
|---|---|---|---|
| | | o,p' | p,p' |
| di-isopropyl | 68 | 1.00 | 0.20 |
| di-n-butyl | 142 | 5.00 | 0.26 |
| di-n-hexyl | 165 | 10.00 | 0.28 |
| anisole | 155 | 10.00 | 1.12 |

The amount of ether to be employed may vary substantially with different ethers depending on the amount of sulfone that can be dissolved as illustrated by the above table. Preferably, of course, there should be enough solvent to dissolve all of the o,p' isomer at the reaction temperature, a slight excess of solvent being usually advisable. It will be understood by those skilled in the art, however, that the selection of the preferred solvent also depends to some extent on the characteristics of the slurry and that it may be advantageous to employ a larger quantity of an ether having less than maximum solubility in order to provide a slurry of workable consistency.

Several different techniques have been used in actually separating a mixture of these isomers. Very good results have been obtained by first dissolving the crude mixture in the minimum amount of a solvent having a boiling point below that of the ether used, such as methanol or acetone (in which the sulfone is very soluble). After adding the required amount of ether (calculated on the amount necessary to dissolve the amount of o,p' isomer present at or near its boiling point) the low boiling solvent was distilled off and the almost pure p,p' isomer crystallized out of the hot ether and was filtered off quickly. A small additional amount of fresh hot ether was then used to wash the crystals. The o,p' isomer can then be crystallized out of the filtrate or recovered from the still pot after distilling off the ether.

The above method provides a very thorough separation of the isomers, but if desired the bulk of the o,p' isomer can be removed by simply boiling a mixture of isomers with a quantity of an ether slightly in excess of that necessary to dissolve the amount of o,p' isomer present and filtering off the essentially pure p,p' isomer from the hot ether solution. The same results can be obtained by refluxing of the ether through a soxhlet type extractor.

The following examples will illustrate the use of the above different techniques in the practice of the invention in separating the isomers in a commercial mixture containing approximately 70% of the p,p' isomer and 30% of the o,p' isomer:

*Example No. 1.*—Into a 250 ml. flask equipped with stirrer, thermometer, and a simple still head connected to a water condenser was added 16 g. of a commercial grade dihydroxy diphenyl sulfone (melting range 217–227° C.). This material was dissolved by adding 20 ml. methanol and warming before adding 100 ml. di-n-butyl ether. The methanol was distilled off and recovered as the solids crystallized out of the hot ether. When the pot temperature reached 142° C. the crystals were filtered on a suction funnel and washed with three 15 ml. portions fresh di-n-butyl ether. After drying to constant weight in an oven at 105° C., 12.2 g. almost white crystals melting at 239–44° C. remained. The ether was distilled from the filtrate leaving 3.8 g. of a crude residue melting at 165–71° C. Re-crystallization of this material from hot water after boiling with charcoal yielded white crystals melting at 169–72° C.

*Example No. 2.*—Into a 250 ml. flask equipped with stirrer, thermometer, and a simple still head connected to a water condenser was added 32 g. of a commercial grade dihydroxy diphenyl sulfones (melting range 217–227° C.). This material was dissolved by adding 50 ml. acetone and warming before adding 100 ml. di-n-hexyl ether. The acetone was distilled off while the solids precipitated from the hot ether solution. When the pot temperature reached 170° C. the crystals were filtered by suction and washed with three 15 ml. portions fresh di-n-hexyl ether. After drying to constant weight there remained 24.1 gm. light cream colored crystals melting at 239–44° C. The ether was removed by distillation leaving 8 gm. residue which, after boiling with charcoal in water, filtering, and cooling, yielded 3.8 g. white crystals melting at 168–72° C. Due to the high boiling point of di-n-hexyl ether, recovery of the o,p' is more difficult than with the lower boiling ethers unless the ether is removed by vacuum distillation.

*Example No. 3.*—Into a soxhlet thimble was placed 50 g. commercial dihydroxy diphenyl sulfones (melting range 217–227° C.). 250 ml. di-n-butyl ether was placed in the 500 ml. pot and refluxed through the material at a steady rate for 5 hours. The solids in the thimble were then dried and found to weigh 36.5 g. and melted at 231–9° C. The ether in the pot containing the other 13.5 g. was distilled off leaving a crude residue melting at 156–9° C.

It will be understood that the invention is not limited to the details of the foregoing description and examples and that reference should be had to the appended claims for a definition of its limits.

What is claimed is:

1. A method of separating p,p' dihydroxy diphenyl sulfone and o,p' dihydroxy diphenyl sulfone from one another which comprises contacting a mixture of said isomers with an ether of the formula R—O—R' where R is an unsubstituted alkyl radical containing from one to six carbon atoms and R' is selected from the group consisting of unsubstituted, alkyl radicals containing from one to six carbon atoms and phenyl, to dissolve the o,p' isomer from the mixture, and then separating said o,p' isomer from the undissolved p,p' isomer.

2. A method of separating p,p' dihydroxy sulfone from mixtures containing p,p' dihydroxy diphenyl sulfone and o,p' dihydroxy diphenyl sulfone which comprises dissolving the o,p' isomer from the mixture with an ether of the group consisting of anisole and ethers of the formula R—O—R' in which R and R' are unsubstituted alkyl radicals containing from one to six carbon atoms.

3. A method of separating p,p' dihydroxy diphenyl sulfone from mixtures containing p,p' dihydroxy diphenyl sulfone and o,p' dihydroxy diphenyl sulfone which comprises dissolving the mixture in an inert solvent, adding to the resultant solution a member of the group consisting of anisole and ethers of the formula R—O—R' where R and R' are unsubstituted alkyl radicals containing from one to six carbon atoms, and then distilling off said inert solvent whereby the p,p' isomer is precipitated leaving the o,p' isomer in solution in said ether.

4. The method defined in claim 3 in which said inert solvent is methanol.

5. The method defined in claim 3 in which said inert solvent is acetone.

6. The method defined in claim 1, said ether being di-isopropyl ether.

7. The method defined in claim 1, said ether being di-n-butyl ether.

8. The method defined in claim 1, said ether being di-n-hexyl ether.

9. The method defined in claim 1, said ether being anisole.

References Cited in the file of this patent

Machek et al.: J. Prakt. Chem. 160, 52–54 (1942).